United States Patent [19]

Konishi et al.

[11] 4,043,123

[45] Aug. 23, 1977

[54] NEGATIVE PRESSURE GENERATING SYSTEM FOR INTERNAL COMBUSTION ENGINE POWERED VEHICLES

[75] Inventors: Hiromu Konishi, Toyota; Mitsuyuki Horie, Susono; Tadahide Toda, Mishima, all of Japan

[73] Assignee: Toyota Jidosha Kogyo Kabushiki Kaisha, Tokyo, Japan

[21] Appl. No.: 688,536

[22] Filed: May 21, 1976

[30] Foreign Application Priority Data

| Dec. 9, 1975 | Japan | 50-146702 |
| Dec. 10, 1975 | Japan | 50-146306 |
| Dec. 19, 1975 | Japan | 50-152154 |

[51] Int. Cl.² .......................................... F15B 3/00
[52] U.S. Cl. ................................... 60/397; 60/411
[58] Field of Search ............... 60/325, 397, 403, 407, 60/411

[56] References Cited

U.S. PATENT DOCUMENTS

| 2,142,514 | 1/1939 | Jones | 60/407 UX |
| 2,705,870 | 4/1955 | Holton | 60/397 |
| 2,732,685 | 1/1956 | Oishei | 60/397 |
| 2,844,003 | 7/1958 | Ingres | 60/397 |
| 2,863,286 | 12/1958 | Doane | 60/397 |

Primary Examiner—Edgar W. Geoghegan

[57] ABSTRACT

A negative pressure generating system for an internal combustion engine powered vehicle, comprising a brake booster incorporated in the vehicle and adapted for an increase in braking power, an air cleaner for cleaning air to be supplied to the internal combustion engine, an air pump which receives air from said air cleaner and delivers the air to said internal combustion engine, and a valve disposed among said brake booster, said air cleaner and said air pump and operative in response to the booster pressure in said brake booster on receiving said pressure as an input signal, thereby interrupting air communication between said air pump and said air cleaner, with the result that the negative pressure arising on the suction side of said air pump is used as a negative pressure source for operating said brake booster.

21 Claims, 8 Drawing Figures

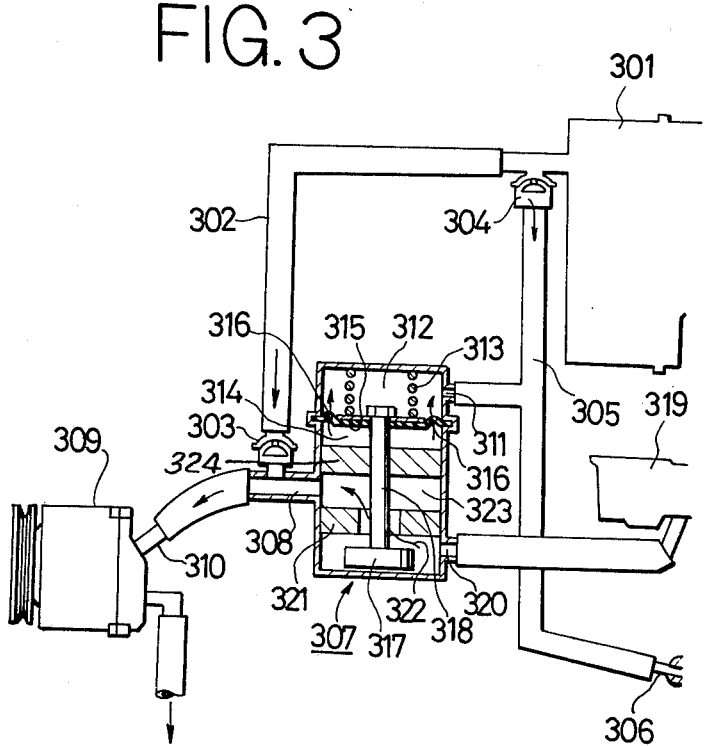
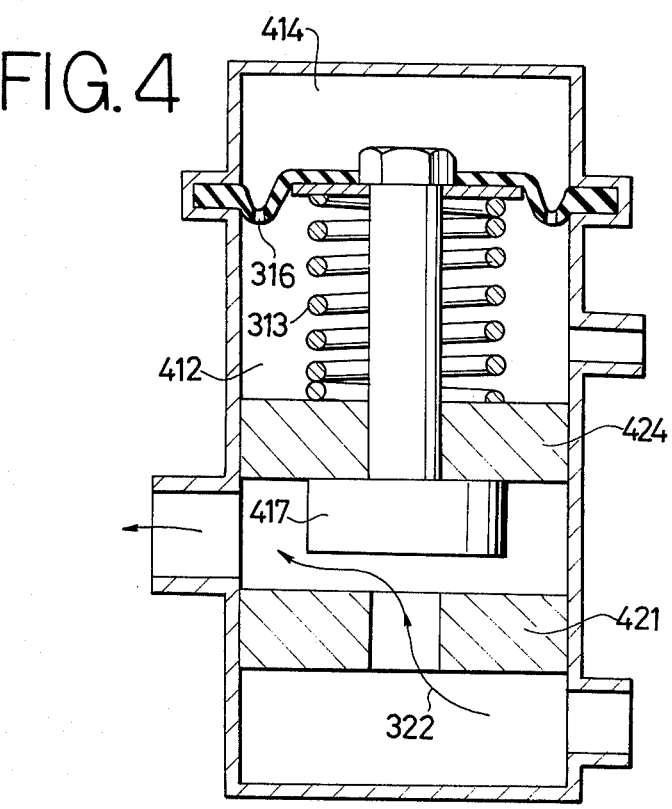

NEGATIVE PRESSURE GENERATING SYSTEM FOR INTERNAL COMBUSTION ENGINE POWERED VEHICLES

BACKGROUND OF THE INVENTION

This invention relates to a negative pressure generating system for vehicles powered by internal combustion engines.

Conventionally employed as a negative pressure source for operating a brake booster in an internal combustion engine powered vehicle was the negative intake pressure in the engine, a vacuum pump, or the like, so that there were such drawbacks as insufficient negative intake pressure in the engine and increases in cost, space, weight and so forth along with the installation of a vacuum pump.

Meanwhile, the air discharged from the air pump was let out into the atmospheric air when unnecessary, for example, when the rotating speed of the engine decreased abruptly, or the discharged air was recirculated to the suction port of the air pump or otherwise wastefully treated.

SUMMARY OF THE INVENTION

An object of this invention is to provide a negative pressure generating system which eliminates the wasteful use of an air pump.

In one form of the negative pressure generating system according to the invention, not only an air pump is used as an air pressure source but also the negative pressure produced on its suction, or intake, side is utilized as a negative pressure source for operating a brake booster in an internal combustion engine powered vehicle, and a selector valve operates on receiving the booster pressure as an input signal. A preferred example of the selector valve is a three-way valve, but this example is to be considered as merely illustrative and non-limitative of the invention, and the same is true throughout the present specification. A typical example of this form is as follows: A connecting conduit or piping connecting the brake booster of the vehicle to the suction port of the air pump is provided with a check valve at an intermediate point of the conduit. Preferably, there is a three-way valve having two ports communicating respectively with the brake booster side and air pump suction port side in respect to the check valve, and another port communicating with a tube extending from an air cleaner. Said three-way valve has a valve body secured to a diaphragm disposed as a partition between a negative pressure chamber communicating with the brake booster and an atmospheric pressure chamber opening to the atmospheric air. Only when the negative pressure transmitted from the brake booster to said negative pressure chamber falls below a preset pressure, said valve body shuts off the air led from the air cleaner to the three-way valve so that the air does not reach the suction port of the air pump, whereby the negative pressure on the air pump suction port side gets to the brake booster through said connecting conduit.

In another form of the negative pressure generating system according to the invention, a circuit is provided to connect an air pump, a selector valve and the intake manifold of an internal combustion engine. The selector valve, which is connected to the suction port side of the air pump, is opened or closed by the pressure signal from the intake manifold of the engine, and the negative pressure created in the vicinity of the suction port of the air pump is used as a negative pressure source for a brake booster in a vehicle driven by the engine. Typically, a conduit connecting the brake booster of the vehicle to the suction port of the air pump is provided with a check valve at an intermediate point of the conduit. There is also a three-way valve having an air outlet port communicating with the air pump suction port side of said check valve, a port for connection to the intake manifold, and an inlet port for the air from an air cleaner. The three-way valve has a negative pressure chamber communicating with the intake manifold, a buffer chamber positioned adjacent said negative pressure chamber and separated therefrom by a diaphragm having small holes, and a valve body formed in rigid connection with an end of a valve stem which is fastened at the other end to said diaphragm. Only when the negative pressure transmitted from the intake manifold to said negative pressure chamber has decreased rapidly, said valve body shuts off the air led from the air cleaner to the three-way valve so that the air does not reach the suction port of the air pump, whereby the negative pressure on the air pump suction port side gets to the brake booster through said connecting conduit.

In still another form of the negative pressure generating system embodying the invention, there is included a selector valve which receives both booster negative pressure and intake manifold negative pressure as input signals, and not only an air pump is used as an air pressure source but also the negative pressure produced on its suction side is utilized as a negative pressure source for operating a brake booster in an internal combustion engine powered vehicle. When the revolution of the engine rapidly decreases the booster negative pressure is insufficient, said selector valve operates to shut off the air passage from an air cleaner to the air pump, thereby resuming the sufficient booster negative pressure. For example, a connecting conduit or pipe line disposed for connection between the brake booster of the internal combustion engine vehicle and the suction port of the air pump is provided at an intermediate point thereof with a check valve. Besides, the selector valve provided in this example includes a first negative pressure chamber for connection to said connecting line, an atmospheric pressure chamber positioned adjacent said first negative pressure chamber and separated therefrom by a diaphragm, a second negative pressure chamber communicating with the intake manifold, a buffer chamber located adjacent said second negative pressure chamber and separated therefrom by another diaphragm having small holes, a valve body formed with a valve stem secured to both said diaphragms, and an air passageway for passing the air supplied through a pipe extending from the air cleaner, to the suction port of the air pump. Only when the revolving speed of the engine has lowered abruptly and the booster negative pressure is insufficient, the valve body closes said air passageway so that the negative pressure on the suction port side of the air pump is applied to the brake booster through said connecting conduit.

Also, a branch pipe leading to the intake manifold can be connected through a check valve to the conduit connecting said brake booster and air pump suction port, at a point therebetween.

This invention thus enables an air pump to serve both as an air pressure source and as a negative pressure source. Therefore, even when there occurs an insufficient negative intake pressure in the engine, the required brake booster negative pressure can be maintained, thereby permitting a reduction in brake pedal depressing force, with no influence exerted on exhaust gas. These effects make the present negative pressure generating system very suitable for use in such internal combustion engine vehicles as motorcars, airplanes, railraod vehicles, and other conveyances which require economy in weight, cost and space. Furthermore, even when the engine speed is suddenly decreased, the brake booster negative pressure can be maintained at a satisfactory level, and the necessary brake pedal depressing force can be lessened, there being other effects such as keeping exhaust gas unaffected, and decreasing the wasteful discharge from the air pump.

BRIEF DESCRIPTION OF THE DRAWINGS

FIGS. 2 through 8 are schematic sectional views illustrating different modifications of the negative pressure generating system embodying the invention.

DETAILED DESCRIPTION OF THE INVENTION

Figure 1:
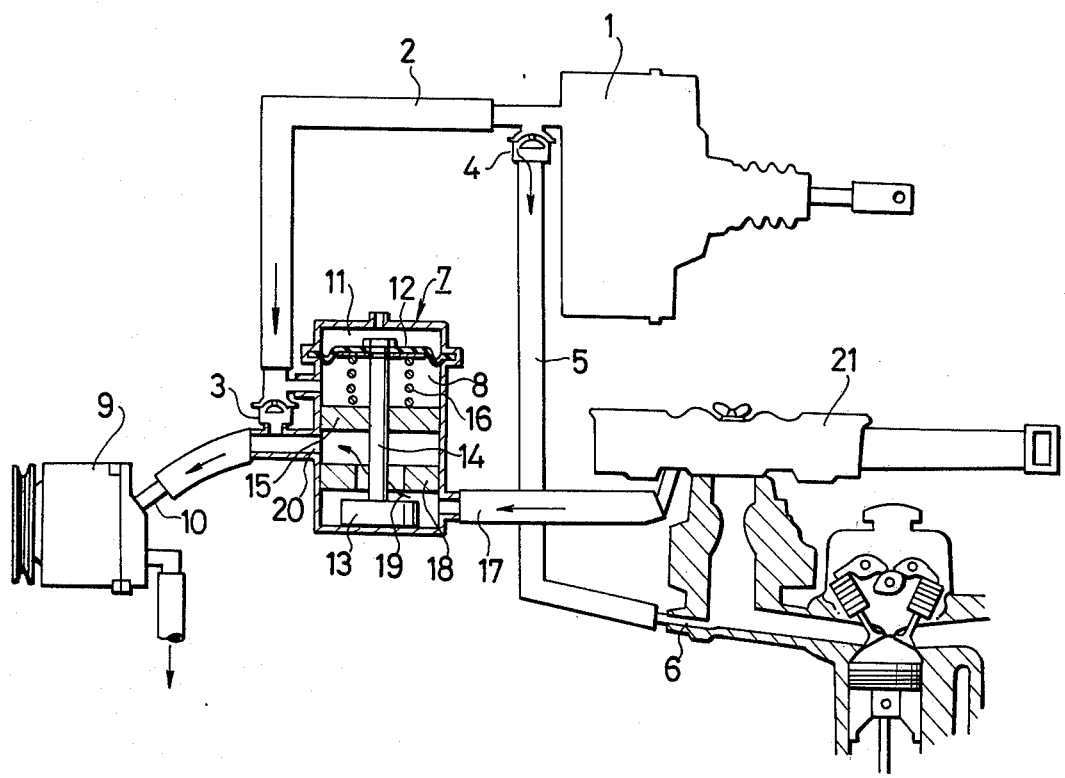
FIG. 1 is a schematic sectional view showing a preferred example of the negative pressure generating system according to the present invention.

Referring to FIG. 1, a brake booster 1 in an internal combustion engine driven vehicle is connected through a connecting conduit or pipe 2 to a check valve 3 and also connected through a check valve 4 and branch pipe 5 to an intake manifold 6. The check valve 3 has an inlet port located on the connecting pipe 2 side and connected to a negative pressure chamber 8 defined in a three-way valve 7, while the outlet port of the check valve 3 is connected both to an air cleaner air passageway 20 of the three-way 7, and to the intake or suction port 10 of the air pump 9. Within the three-way valve 7, a diaphragm 12 is placed between an atmospheric pressure chamber 11 and the negative pressure chamber 8 and partially defines both said chambers. Fastened to the diaphragm 12 is one end of a valve stem 14 formed with a valve body 13. In the negative pressure chamber 8 there is a return spring 16 between the diaphragm 12 and a partition wall 15 through which the valve stem 14 in rigid connection with the valve body 13 extends. On the other hand, a pipe 17 extends to pass air from an air cleaner 21 to the three-way valve 7. The air can then be conducted into the passageway 20 through a clearance 19 made between the valve stem 14 and a partition wall 18.

Reference is now made to the operation of this preferred embodiment. When the negative pressure in the brake booster 1 is insufficient, there is also an insufficient negative pressure in the negative pressure chamber 8 of the three-way valve 7, and the return spring 16 acts to press the diaphragm 12 upward. As a result, the valve body 13 secured to the diaphragm 12 closes the clearance 19 between the partition wall 18 and the valve stem 14, thereby shutting off the air flowing from the air cleaner 21 into the suction port 10 of the air pump 9. Hence, a negative pressure arises in the air passageway 20 to open the check valve 3, thus recovering a sufficient negative pressure in the brake booster 1 which also is present in the chamber 8 of the valve 7. Consequently, the pressure in the atmospheric pressure chamber 11 and the negative pressure in the chamber 8 presses back the diaphragm 12 against the force of the spring 16, and causes the valve body 13 to open the clearance 19 so that the air from the air cleaner 21 again passes into the passageway 20 leading to the suction port 10 of the air pump 9. Thus, when the negative pressure in the brake booster 1 is insufficient, the three-way valve 7 closes to effect a recovery from the insufficient negative pressure, and when the negative pressure in the brake booster 1 is sufficient, the three-way valve 7 opens to deliver the air from the air cleaner 21 into the suction port 10 of the air pump 9. On the other hand, since the brake booster 1 is connected to the intake manifold 6 through the check valve 4, both the negative pressure in the intake manifold 6 and the negative pressure at the air pump suction port 10 side can be applied to the brake booster 1. Thus, when the negative pressure in the intake manifold 6 exceeds that in the brake booster 1, the check valve 4 opens to provide the required negative pressure in the brake booster 1.

This invention also enables the brake booster to be connected only to the negative pressure line directed to the air pump suction port, without the use of the negative pressure line to the intake manifold.

Although the three-way valve in this embodiment is operated by the air signal from the negative pressure chamber of the brake booster, it is also possible to use a hydraulic or electric signal instead of the air signal to attain the same purpose.

Figure 2:
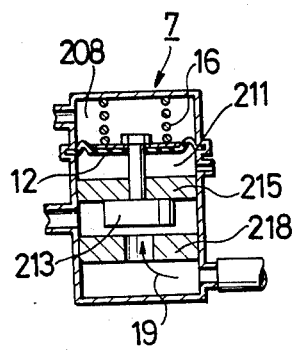

FIG. 2 illustrates another preferred embodiment of the invention. In this embodiment, the positions of the atmospheric pressure chamber 11 and negative pressure chamber 8 shown in FIG. 1 are reversed. That is to say, a negative pressure chamber 208 is positioned above an atmospheric pressure chamber 211 (as viewed in FIG. 2), and a valve body 213 is adapted to move between partition walls 215 and 218. Both embodiments are thus different only in construction and substantially similar in operation.

FIG. 3 shows still another preferred embodiment. A brake booster 301 in an internal combustion engine vehicle is connected to a check valve 303 through a connecting pipe 302, and also to an intake manifold 306 through a check valve 304 and a branch pipe 305. The check valve 303 also has an opening to an air outlet port 308 of the three-way valve 307 and to the suction port 310 of the air pump 309 continuous therewith. The three-way valve 307 includes a negative pressure chamber 312 opening into a connection port 311 which is connected to the branch pipe 305. The negative pressure chamber 312 contains a return spring 313 and is separated from an adjacent buffer chamber 314 by a diaphragm 315 which is located therebetween and formed with small holes 316. Fastened to the diaphragm 315 is one end of a valve stem 318 coupled to a valve body 317. On the other hand, the three-way valve 307 has an air inlet port 320 for receiving air from an air cleaner 319. In response to the movement of the diaphragm 315, the valve body 317 opens or closes a clearance 322 formed in an opening partition wall 321. The clearance 322 communicates with the air outlet port 308 through an air chamber 323 which is separated from the buffer chamber 314 by a partition wall 324 interposed therebetween, and a valve stem 318 extends through the partition wall 324.

Next, reference is made to the operation of this embodiment. When the pressure in the intake manifold 306 of the engine decreases rapidly, there also occurs a rapid decrease in the negative pressure in the negative pressure chamber 312. Since the negative pressure chamber 312 is separated from the buffer chamber 314 by the diaphragm 315 having the small holes 316, a pressure difference arises between the negative pressure chamber 312 and the buffer chamber 314 and causes the diaphragm 315 to move against the return spring 313, so that the valve body 317 interlocked with the diaphragm 315 closes the clearance 322 and shuts off the air flowing from the air cleaner 319 into the suction port 310 of the air pump 309. A negative pressure is therefore produced in the air chamber 323 to open the check valve 303, with the result that the desired negative pressure arises in the negative pressure or vacuum chamber (not shown) in the brake booster 301. After several seconds, when a substantial decrease has taken place in the pressure difference between the negative pressure chamber 312 and the buffer chamber 314, the compressed return spring 313 forces back the diaphragm 315, so that the valve body 317 interlocked with the diaphragm 315 moves apart from the clearance 322, which can then pass the air from the air cleaner 319 to the suction port 310 of the air pump 309. It will thus be understood that the air pump 309 serves both as a negative pressure source and as an air pressure source. The air discharged from the air pump 309 is supplied to necessary locations. The rapid pressure decrease in the negative pressure chamber 312 occurs in cases of slowdown operation and the like, and is therefore effective to achieve braking power augmentation which is required particularly in such cases. Furthermore, for air injection and other purposes, the air discharged from the air pump is often unnecessary, so that the interruption, in such cases, of the supply of wasteful air to the air pump suction port 310 is very acceptable.

In addition, according to the invention, the negative pressure line to the intake manifold can be omitted, with the brake booster connected only to the negative pressure line to the suction port of the air pump.

Although the three-way valve in this embodiment is operated by the air signal from the intake manifold as a negative pressure source, it is also possible to use a hydraulic or electric signal instead of the air signal to attain the same purpose.

FIG. 4 shows another exemplary three-way valve according to the present invention. In this three-way valve, the negative pressure chamber 312 and buffer chamber 314 shown in FIG. 3 are reversed in position; that is, a buffer chamber 414 is positioned above a negative pressure chamber 412 (as viewed in FIG. 4), and a valve body 417 is adapted to move between a partition wall 424 and an opening partition wall 421. Both embodiments are thus different only in construction and substantially similar in operation.

Figure 5:
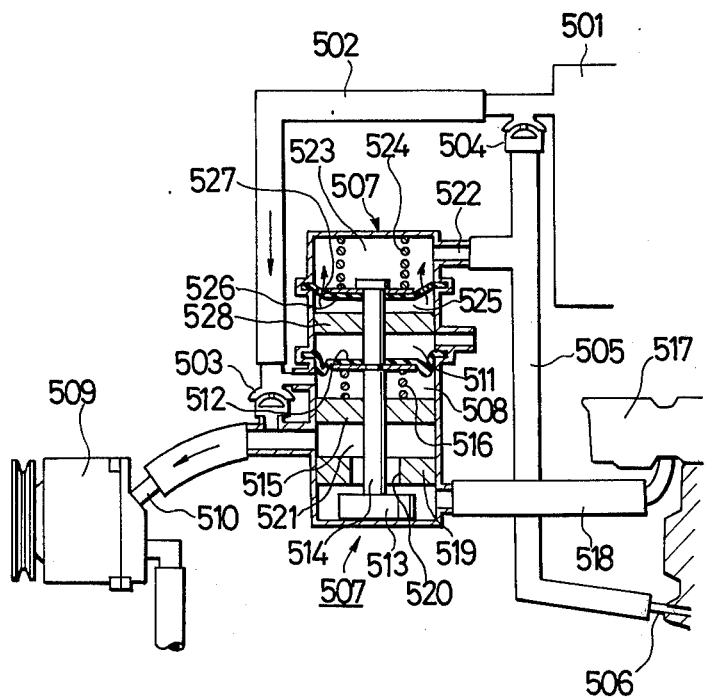

FIG. 5 illustrates still another preferred embodiment of this invention. A brake booster 501 in an internal combustion engine driven vehicle is connected through a connecting pipe 502 to a check valve 503 and also connected through a check valve 504 and a branch pipe 505 to an intake manifold 506. The connecting pipe 502 is connected to a first negative pressure chamber 508 formed in a selector valve 507. A pipe located on the opposite side to the brake booster side of the check valve 503 is connected to an air passageway 521 defined in the selector valve 507 to pass the air supplied from an air cleaner 517, and is also connected to the suction port 510 of an air pump 509. Within the selector valve 507, a diaphragm 512 is placed between an atmospheric pressure chamber 511 and the first negative chamber 508 and partially defining both said chambers. A valve stem 514 formed with a valve body 513 extends through the diaphragm 512 and is fastened thereto at a point between both ends of the stem. In the first negative pressure chamber 508 there is a return spring 516 between the diaphragm 512 and a partition wall 515 through which the valve stem 514 in rigid connection with the valve body 513 extends. On the other hand, a pipe 518 extends to pass air from an air cleaner 517 to the selector valve 507. The air can then be conducted into the passageway 521 through a clearance opening 520 in the partition wall 519 and through which the valve stem 514 passes. The selector valve 507 also includes a second negative pressure chamber 523 opening into a connection port 522 which is connected to the intake manifold through the branch pipe 505. The second negative pressure chamber 523 contains a return spring 524 and is separated from an adjacent buffer chamber 525 by a diaphragm 526 which is located therebetween and formed with small holes 527. Fastened to the diaphragm 526 is one end of the valve stem 514. Interposed between the buffer chamber 525 and the atmospheric pressure chamber 511 is a partition wall 528 through which the valve stem 514 extends.

The operation of this embodiment is as described below. When the pressure in the intake manifold 506 of the engine decreases rapidly and the negative pressure in the negative pressure chamber (not shown) in the brake booster 501 is insufficient, there also occurs a rapid decrease in the pressure in the second negative pressure chamber 523. Since the second negative pressure chamber 523 is separated from the buffer chamber 525 by the diaphragm 526 having the small holes 527, a pressure difference arises between the second negative pressure chamber 523 and the buffer chamber 525 and forces the diaphragm 526 against the return spring 524. Also, when the negative pressure in the brake booster 501 is insufficient, there is also an insufficient negative pressure in the first negative pressure chamber 508, and the return spring 516 acts to force the diaphragm 512 against the pressure in the atmospheric pressure chamber 511. The resultant force acting on both diaphragms 526 and 512 causes the valve body 513 interlocked with both diaphragms to close the clearance 520 in the opening partition wall 519, thereby shutting off the air flowing from the air cleaner 517 through the pipe 518 into the suction port 510 of the air pump 509. Hence, a negative pressure arises in the air passageway 521 to open the check valve 503, thus providing a sufficient negative pressure in the brake booster 501. When a sufficient negative pressure is provided in the brake booster 501 or when, after several seconds, there is no pressure difference between the buffer chamber 525 and the second negative pressure chamber 523 due to air leakage from the buffer chamber 525 to the second negative chamber 523 through the small holes 527 formed in the diaphragm 526 in the selector valve 507, which is preferably a three-way valve, the restorative force of the return spring 524 or 516 moves back the diaphragms 526 and 512. As a result, the valve body 513 opens the clearance 520 to pass the air from the air cleaner 517 into the suction port 510 of the air pump 509.

Figure 6:
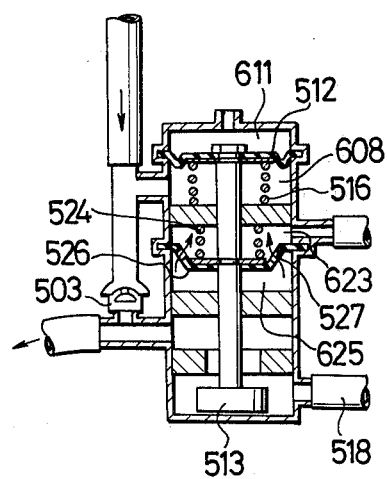

FIG. 6 shows still another embodiment of the invention. In this embodiment, the combination of the second negative pressure chamber 523 and buffer chamber 525 shown in FIG. 5 and that of the first negative chamber 508 and atmospheric pressure chamber 511 shown therein are reversed in position. That is to say, from above as viewed in FIG. 6, an atmospheric pressure chamber 611, a first negative pressure chamber 608, a negative pressure chamber 623 and a buffer chamber 625 are arranged in the order of mention. This embodiment is not different in operation from that shown in FIG. 5.

Figure 7:
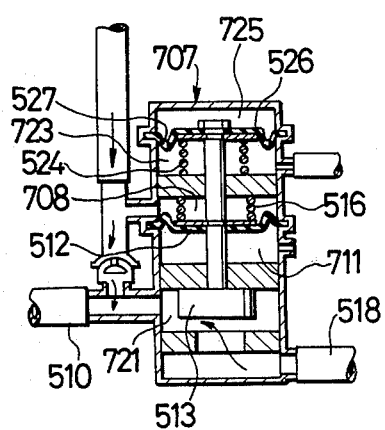

FIG. 7 shows still another embodiment of the invention. In this embodiment, a three-way valve 707 includes, in order from above, a buffer chamber 725, a second negative pressure chamber 723, a first negative pressure chamber 708, an atmospheric pressure chamber 711 and an air passageway 721. This embodiment is otherwise similar to that shown in FIG. 5.

Figure 8:
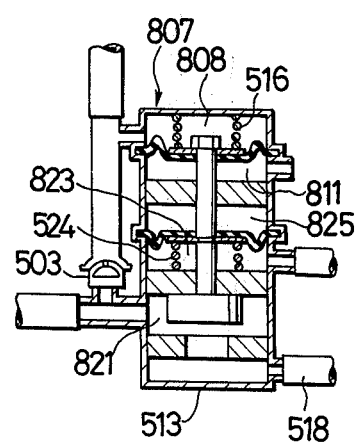

FIG. 8 illustrates yet another embodiment of the invention, wherein a three-way valve 807 includes, in order from above, a first negative pressure chamber 808, an atmospheric pressure chamber 811, a buffer chamber 825, a second negative pressure chamber 823 and an air passageway 821. In other respects, this embodiment is similar to that in FIG. 5.

This invention may be practiced or embodied in still other ways without departing from the spirit or essential character thereof. The preferred embodiments described herein are therefore illustrative and not restricted, the scope of the invention being indicated by the appended claims and all variations which come within the meaning of the claims are intended to be embraced therein. For example, in each of the embodiments shown in FIGS. 5 and 6, wherein the branch pipe 505 connects the intake manifold 506 of the engine to the negative pressure chamber (not shown) of the brake booster 501 through the check valve 504, this check valve may be eliminated and the branch pipe 505 may be closed. Furthermore, although the three-way valve 507 in each of said embodiments is shown as being operable by an air signal, alternative use of a hydraulic or electric signal is practicable to control the valve. Electric means available for the same purpose are, for example:

i. means to open or close a solenoid valve with the use of a pressure switch adapted to sense the booster pressure;

ii. means to open or close a solenoid valve by conversion from intake manifold pressure to electric signal and through the use of a differentiator and a comparator; and iii. means to open a solenoid valve only when both booster pressure and intake manifold pressure reach a predetermined value.

What is claimed is:

1. A negative pressure generating system for an internal combustion engine powered vehicle, comprising:
   a brake booster incorporated in the vehicle and adapted to cause an increase in braking power;
   an air cleaner for cleaning air to be supplied to the internal combustion engine;
   an air pump which receives air from said air cleaner and delivers the air to said internal combustion engine; and
   a selector valve disposed among said brake booster, said air cleaner and said air pump and operative in response to a booster pressure in said brake booster on receiving said pressure as an input signal, thereby interrupting air communication between said air pump and said air cleaner, with the result that the negative pressure arising on the suction side of said air pump is used as a negative pressure source for operating said brake booster.

2. A negative pressure generating system as defined in claim 1, wherein said brake booster is connected to the suction port of said air pump by a connecting conduit which is provided at an intermediate point thereof with a check valve, said check valve communicating on the inlet side thereof with said brake booster and on the outlet side thereof with an air flow passageway between said air pump and said air cleaner.

3. A negative pressure generating system as defined in claim 2, wherein said selector valve is a three-way valve.

4. A negative pressure generating system as defined in claim 3, wherein said three-way valve includes a negative pressure chamber, a diaphragm which operates in response to a change in the pressure in said negative pressure chamber, a valve stem affixed to and movable with said diaphragm, and a valve body formed rigidly with said valve stem and adapted to selectively shut off the air flow passageway between said air cleaner and said air pump in accordance with the movement of said valve stem.

5. A negative pressure generating system as defined in claim 4, wherein said negative pressure chamber communicates with said brake booster, and said diaphragm is interposed between said negative pressure chamber and an atmospheric pressure chamber opening to atmospheric air.

6. A negative pressure generating system as defined in claim 5, wherein said three-way valve includes a first partition wall and a second partition wall, and said valve stem extends slidably through a hole formed in said first partition wall.

7. A negative pressure generating system as defined in claim 6, wherein said negative pressure chamber is positioned between said diaphragm and said first partition wall and contains a return spring; said valve body is disposed outside said second partition wall; and a clearance is formed between said valve stem and said second partition wall so that the air delivered from said air cleaner can flow to said air pump through said clearance when the need arises.

8. A negative pressure generating system as defined in claim 6, wherein said negative pressure chamber is positioned outside said diaphragm and contains a return spring; said valve body is disposed between said first and second partition walls; and said second partition wall has a hole formed therethrough so that the air delivered from said air cleaner can flow to said air pump through said hole when the need arises.

9. A negative pressure generating system as defined in claim 7, wherein said connecting conduit is connected to an intake manifold through a branch pipe provided with a check valve.

10. A negative pressure generating system as defined in claim 8, wherein said connecting conduit is connected to an intake manifold through a branch pipe provided with a check valve.

11. A negative pressure generating system as defined in claim 4, wherein said negative pressure chamber communicates with an intake manifold, and said diaphragm has small holes and is interposed between said negative pressure chamber and an enclosed buffer chamber.

12. A negative pressure generating system as defined in claim 11, wherein said brake booster is connected to the intake manifold and said negative pressure chamber through branch piping provided with a check valve.

13. A negative pressure generating system as defined in claim 12, wherein said three-way valve includes a first partition wall and a second partition wall, and said valve stem extends slidably through a hole formed in said first partition wall.

14. A negative pressure generating system as defined in claim 13, wherein said negative pressure chamber is positioned outside said diaphragm and contains a return spring; said valve body is disposed outside said second partition wall; and a clearance is formed between said valve stem and said second partition wall so that the air delivered from said air cleaner can flow to said air pump through said clearance when the need arises.

15. A negative pressure generating system as defined in claim 13, wherein said negative pressure chamber is positioned between said diaphragm and said first partition wall and contains a return spring; said valve body is disposed between said first and second partition walls; and said second partition wall has a hole formed therethrough so that the air delivered from said air cleaner can flow to said air pump through said hole when the need arises.

16. A negative pressure generating system as defined in claim 3, wherein said three-way valve includes a first negative pressure chamber connected to said connecting conduit; an atmospheric pressure chamber located adjacent said first negative pressure chamber and separated therefrom by a first diaphragm; a second negative pressure chamber communicating with an intake manifold; a buffer chamber situated adjacent said second negative pressure chamber and separated therefrom by a second diaphragm having small holes; a valve body formed rigidly with a valve stem secured to both said diaphragms; and an air passageway through which the air delivered from the air cleaner through a pipe is supplied to the suction port of said air pump; said valve body being adapted to selectively shut off said air passageway in response to the movement of said diaphragms.

17. A negative pressure generating system as defined in claim 16, wherein a branch conduit leading to the intake manifold is connected through a check valve to said connecting conduit at an intermediate point thereof.

18. A negative pressure generating system as defined in claim 16, wherein said three-way valve includes, in order, said second negative pressure chamber, said second diaphragm, said buffer chamber, a first partition wall, said atmosphere pressure chamber, said first diaphragm, said first negative pressure chamber, a second partition wall and a third partition wall; a return spring being disposed in each of said first and second negative pressure chambers; said valve stem extending slidably through holes formed in said first and second partition walls; and a clearance is made between said third partition wall and said valve stem to form a portion of said air passageway.

19. A negative pressure generating system as defined in claim 16, wherein said three-way valve includes, in order, said atmospheric pressure chamber, said first diaphragm, said first negative pressure chamber, a first partition wall, said second negative pressure chamber, said second diaphragm, said buffer chamber, a second partition wall and a third partition wall; a return spring being disposed in each of said first and second negative pressure chambers; said valve stem extending slidably through holes formed in said first and second partition walls; and a clearance is made between said valve stem and said third partition wall to form a portion of said air passageway.

20. A negative pressure generating system as defined in claim 16, wherein said three-way valve includes, in order, said buffer chamber, said second diaphragm, said second negative pressure chamber, a first partition wall, said first negative pressure chamber, said first diaphragm, said atmospheric pressure chamber, a second partition wall and third partition wall; a return spring being disposed in each of said first and second negative pressure chambers; said valve stem extending slidably through holes formed in said first and second partition walls; and said third partition wall has a hole formed therethrough to serve as a part of said air passageway.

21. A negative pressure generating system as defined in claim 16, wherein said three-way valve includes, in order, said first negative pressure chamber, said first diaphragm, said atmospheric pressure chamber, a first partition wall, said buffer chamber, said second diaphragm, said second negative pressure chamber, a second partition wall and a third partition wall; a return spring being disposed in each of said first and second negative pressure chambers; said valve stem extending slidably through holes formed in said first and second partition walls; and said third partition wall has a hole formed therethrough to serve as a part of said air passageway.

* * * * *